US005733061A

United States Patent [19]

Child

[11] Patent Number: 5,733,061

[45] Date of Patent: Mar. 31, 1998

[54] CLAMP

[75] Inventor: Michael Child, Kearns, Utah

[73] Assignee: Zevex, Inc., Murray, Utah

[21] Appl. No.: 616,295

[22] Filed: Mar. 15, 1996

[51] Int. Cl.$^6$ .................................. B25B 5/06; F16B 7/04

[52] U.S. Cl. ............................ 403/385; 269/43; 269/249; 403/59; 403/399

[58] Field of Search .............................. 269/43, 101, 249, 269/902; 403/59, 92, 93, 95, 385, 389, 398, 399, DIG. 9

[56] References Cited

U.S. PATENT DOCUMENTS

| | | | |
|---|---|---|---|
| 184,957 | 12/1876 | Doeg | 403/399 X |
| 252,969 | 1/1882 | Porter | 269/43 X |
| 291,248 | 1/1884 | West | 269/249 |
| 989,893 | 4/1911 | Brick | 269/101 |
| 1,059,217 | 4/1913 | Rudy | 403/59 X |
| 1,066,357 | 7/1913 | Yardley | 269/249 X |
| 1,160,103 | 11/1915 | Burkhart | 269/249 X |
| 1,403,863 | 1/1922 | Peat | 403/59 X |
| 1,749,491 | 3/1930 | Kokay | 269/249 X |
| 2,101,317 | 12/1937 | Lemieux | 403/385 X |
| 2,116,263 | 5/1938 | Harbaugh | 269/43 X |
| 2,322,107 | 6/1943 | Balcar | 269/249 X |
| 2,448,402 | 8/1948 | Thompson | 269/249 X |
| 2,638,301 | 5/1953 | Smith | 403/385 X |
| 2,756,789 | 7/1956 | Kraus et al. | 269/249 X |
| 2,867,003 | 1/1959 | Stiles | 269/249 X |
| 3,268,853 | 8/1966 | Noker et al. | 403/399 X |
| 3,442,478 | 5/1969 | Parapetti | 403/59 X |
| 3,803,012 | 4/1974 | Kurr | 24/569 X |
| 3,883,128 | 5/1975 | Breese | 269/101 X |
| 4,881,843 | 11/1989 | Randleman | 403/92 |

FOREIGN PATENT DOCUMENTS

| | | | |
|---|---|---|---|
| 1108013 | 5/1961 | Germany | 269/43 |
| 225758 | 12/1924 | United Kingdom | 403/385 |

OTHER PUBLICATIONS

"Twin Clamps Aid Welding" by Kirk; from American magazine. no date.

*Primary Examiner*—Kenneth J. Dorner
*Assistant Examiner*—Andrea Chop
*Attorney, Agent, or Firm*—Thorpe North & Western, LLP

[57] ABSTRACT

A clamp having an attachment mechanism for holding and positioning a second object attached to the clamp relative to a first object secured by the clamp. The clamp includes a clamping member for securing the first object and an attachment mechanism for holding the clamp to the second object. The clamping member includes a scrape preventive mechanism. The attachment mechanism includes a positioning member for positioning the second object relative to the first object without detaching the second object from the clamping member. The attachment member is hand operable.

13 Claims, 5 Drawing Sheets

CLAMP

BACKGROUND OF THE INVENTION

1. The Field of the Invention

The present invention pertains generally to the field of clamps. More particularly, it concerns a clamp capable of selectively adjusting the positions of two relative objects secured by the clamp.

2. The Background Art

Clamps have long been used to secure objects by pressing objects together, pinching objects, and grasping objects. Clamps offer a number of advantages, including the ability to secure objects for lengthy periods of time, at particular angles, and at desirable points.

Occasionally, it is desirable to attach a second object to a clamp. One common approach for attaching a second object to a clamp is to bolt the clamp to the second object, including a bench or work-table. When it is desired to change the position of the object secured by the clamp relative to the object attached to the clamp, either the object secured by the clamp must be released and resecured, or the object attached to the clamp must be detached and reattached. Adjusting the relative positions of the objects usually require tools, is often rather cumbersome, and after repeated adjustments wears and scrapes the clamp and the objects attached and secured to the clamp.

Attempts have been made to accommodate selectively adjusting the relative positions of the objects without the above disadvantages. One approach has been to attach a threaded shaft to a clamp so that as the shaft is turned the clamp moves along the threaded shaft to the desired position. A limitation of such a shaft device is that the position of the object is changed only along a single axis, thus requiring additional shaft devices be used to achieve the desired movement. A further limitation is that each adjustment requires a number of turns of each shaft to achieve a desired position. Such devices are slow and cumbersome to use.

OBJECTS AND SUMMARY OF THE INVENTION

It is therefore an object of the present invention to provide a clamp capable of selectively adjusting the position of an object attached to the clamp relative to an object secured by the clamp without releasing either object.

It is another object of the invention to provide such a clamp which is simple in design and manufacture whereby the relative positions of the objects can be changed quickly, simply, and efficiently.

It is another object of the invention to provide such a clamp which reduces wear on the objects secured and attached.

It is another object of the invention to provide such a clamp which is manually operable.

It is another object of the invention to provide such a clamp which can vary the force by which the second object is attached.

It is an additional object of the invention to provide such a clamp which has an attachment means specifically tailored to fit the object attached to the clamp.

The above and other objects not specifically recited are realized in a specific illustrative embodiment of an improved clamp. The clamp includes a clamping member for securing a first object and an attachment mechanism for holding the clamp to a second object. The clamping member includes a scrape preventive mechanism. The attachment mechanism includes an attachment member for affixing the second object and a resilient positioning mechanism for positioning the second object relative to the first object. The attachment mechanism may be operated by hand, is variable as to the force attaching an object, and interfaces with the object.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION

Figure 1:
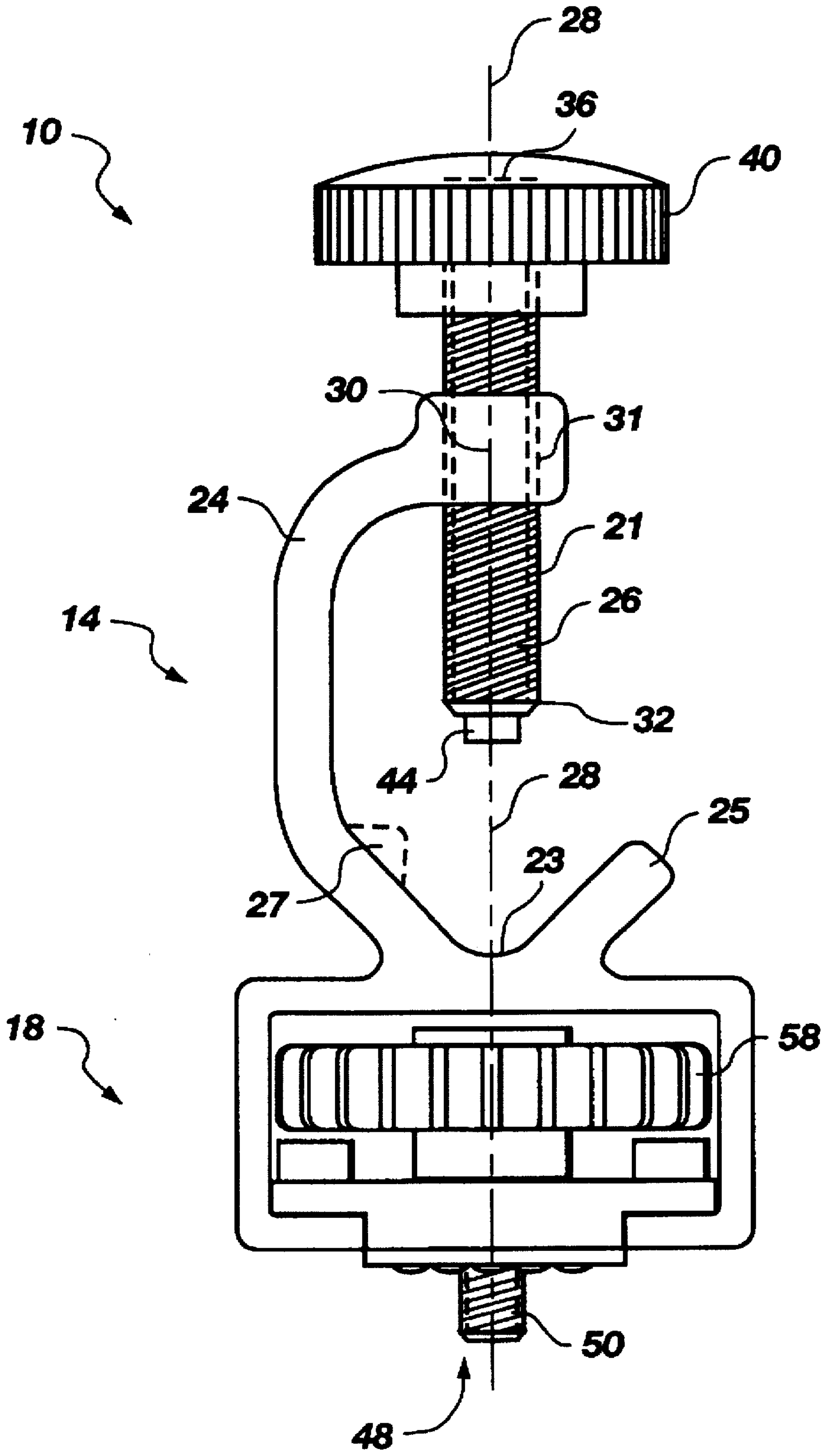
FIG. 1 is a side view of the clamp made in accordance with the principles of the present invention.
Figure 2:
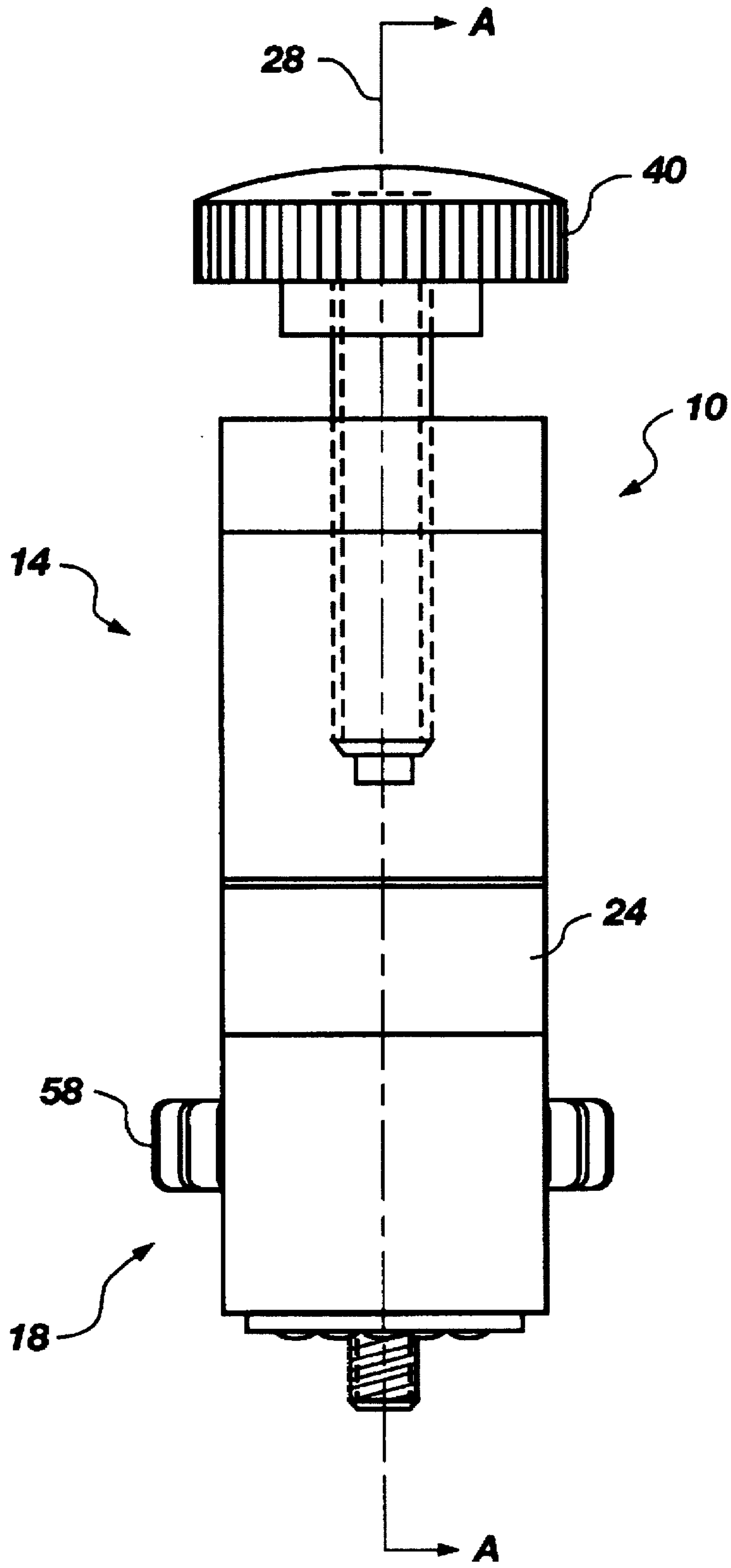
FIG. 2 is a rear view of the clamp of FIG. 1.
Figure 3:
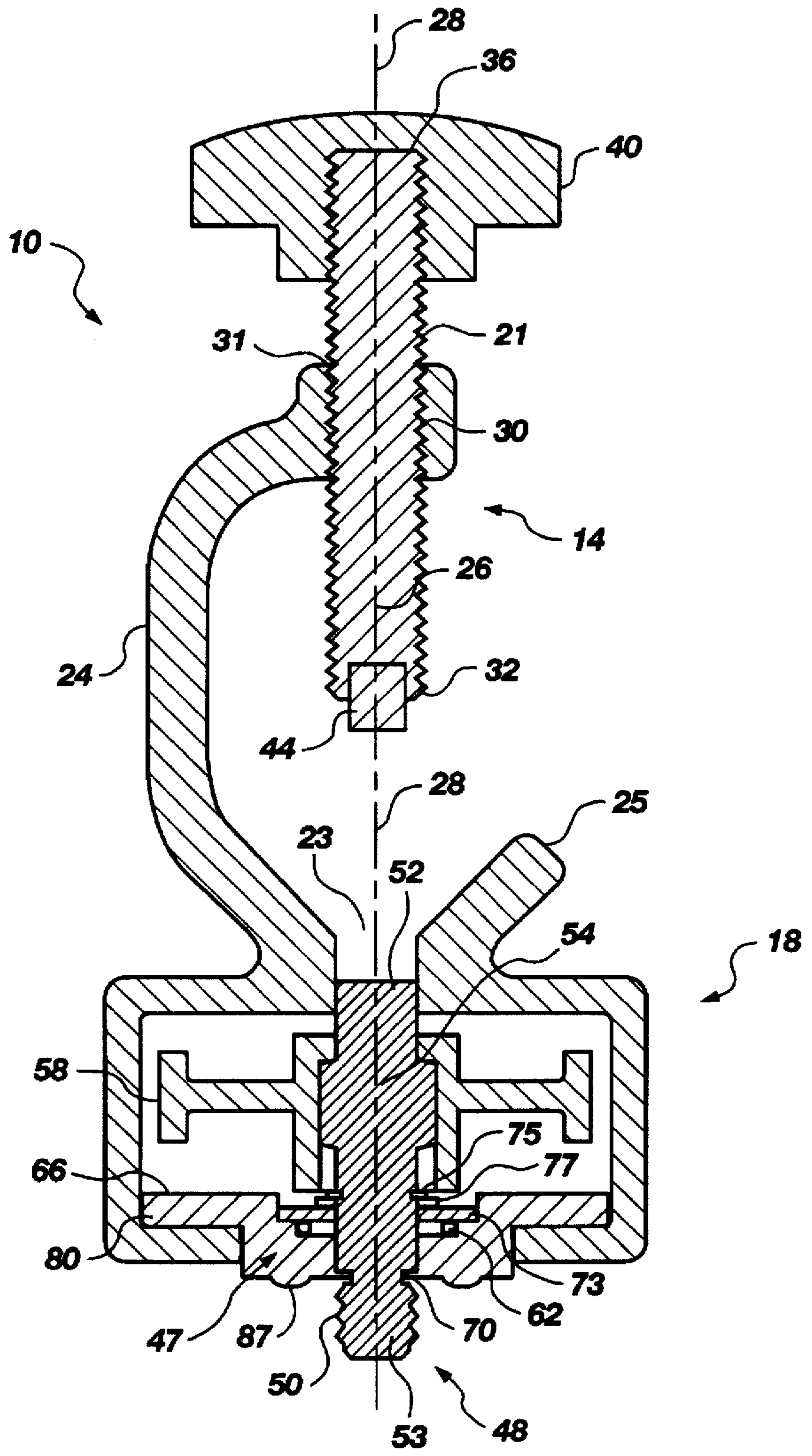
FIG. 3 is a cross-sectional view of the clamp of FIG. 1, taken along section A—A of FIG. 2.

Referring to FIGS. 1–3, there is shown a clamp, generally designated at 10. The clamp 10 has a clamping member designated generally at 14 and an attachment mechanism designated generally at 18 coupled to the clamping member 14.

The preferred embodiment of the clamping member 14 has a longitudinal axis 28, on said axis 28 a shaft 21 passes through a hole 31 in the body 24. The body 24 includes a holding pocket 23 formed therein and a first clamping arm 25. An optional second clamping arm 27, shown in phantom line in FIG. 1, may also be provided as part of the body. The shaft 21 has threads 26 which are disposed in threaded engagement with threads 30 in the hole 31 through the body 24. The shaft 21 has a distal end 32 and a proximal end 36. A knob 40 is attached to the proximate end 36 of the shaft 21 and a hub 44 is coupled to the distal end 32 of the shaft 21. Rotation of the knob 40 actuates the threaded engagement of the shaft 21 with the body 24 to selectively advance and retract the nub 44 toward and away from the holding pocket 23, respectively. This configuration enables a first object 210 to be secured between the nub 44 and the holding pocket, or between the nub 44 and the clamping arms 25 and 27. The nub 44 attached to the shaft 21 at the distal end 32 is made of plastic or other material so as to prevent scraping, marking, or denting of the first object when the clamping member 14 secures the first object.

The clamping member 14 is designed to hold on to such first objects such as a pole, a desk, a table, a chair, a bed, a table, a rack, or some similar structure.

Figure 4:
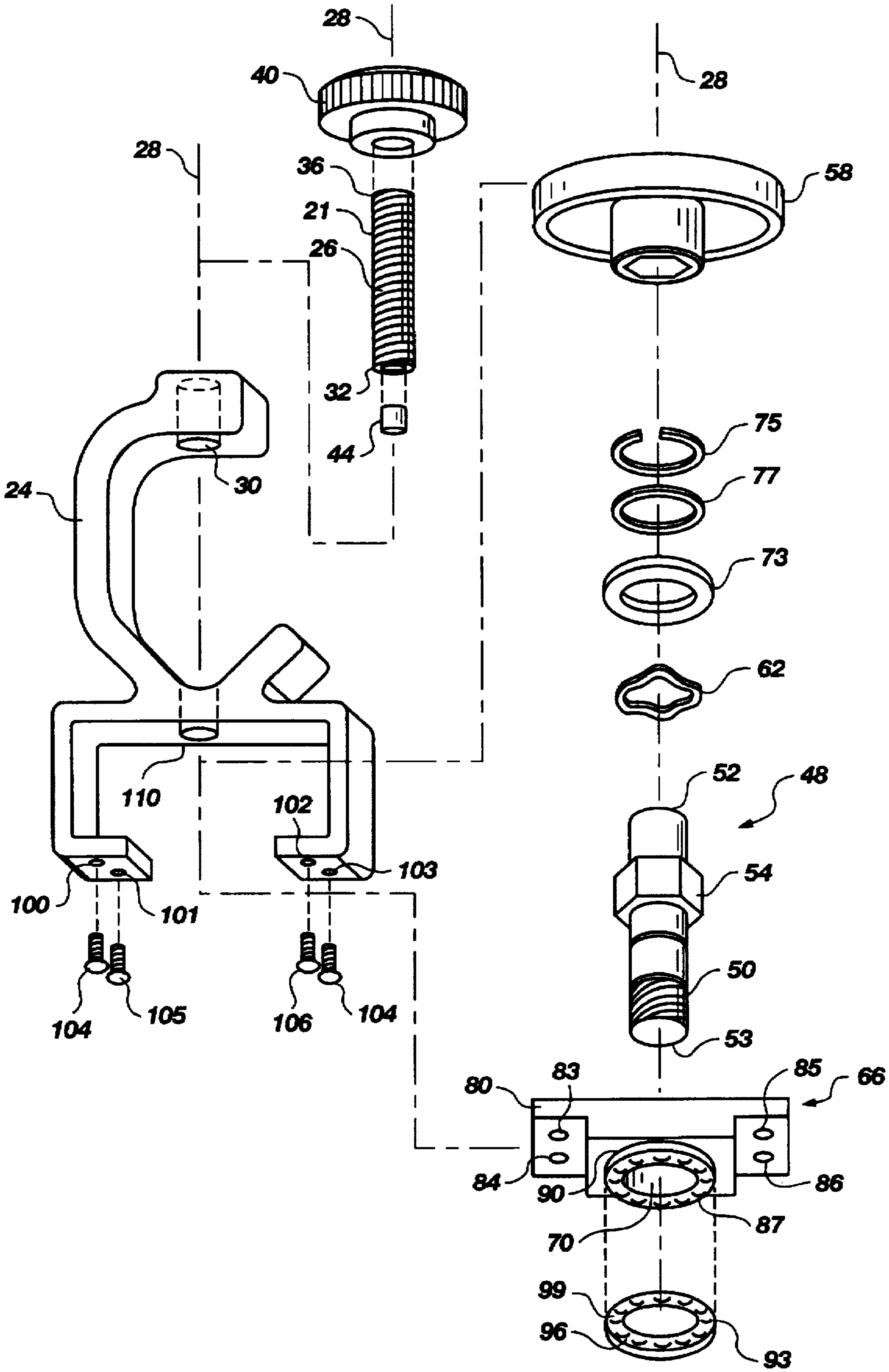
FIG. 4 is an exploded view of the clamp of FIG. 1.

The attachment mechanism 18 holds a second object 200 to the clamping member 14. The attachment mechanism 18, shown in FIGS. 3–4, is comprised of a resilient positioning mechanism 47 and a shaft designated generally at 48 having a keyed shank 54 with a first end 52 and a second end 53 the second end having threads 50. A wheel 58 is attached to the keyed shank 54, by which the shank can be turned. When a second object is placed against the second end 53 of the shank 54, the shank may be turned by rotating the wheel 58, and the object affixed to the attachment mechanism 18 by the engagement of the threads 50 of the second end 53 of the shank 54 by entry into a hole 202 (FIG. 5) in the second object.

FIG. 2 shows the rear view of the clamp 10 with a representation of the relative sizes of the body 24 of the clamping member 14 and the wheel 58. The diameter of the wheel 58 is sufficiently large to allow easy access to it by an operator's hand.

Referring again to FIGS. 3–4, the positioning mechanism 47 of the preferred embodiment is shown, which comprises a spring washer 62 and an interfacing member 66. The interfacing member 66 has a hole 70 through which the shaft 48 slides. Disposed between the shaft 48 and the interfacing member 66 is the spring washer 62.

Figure 5:
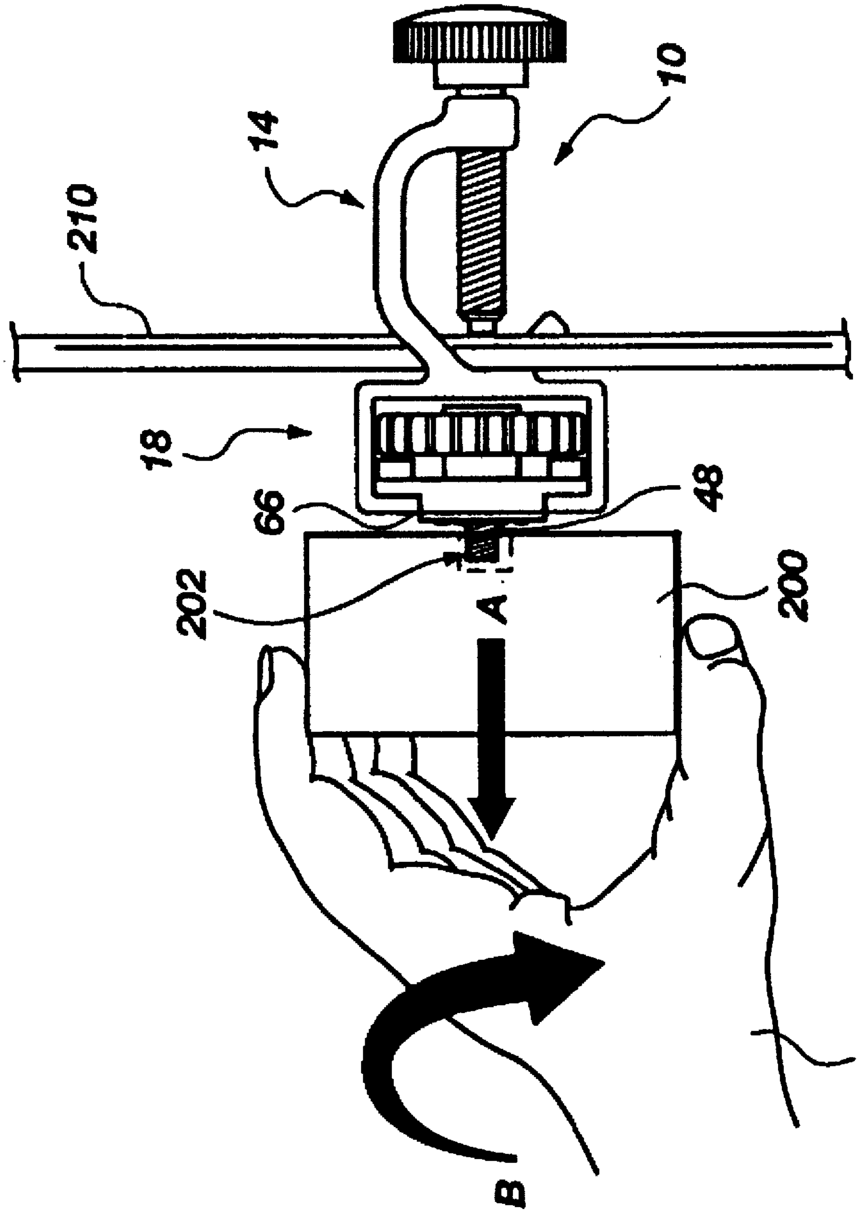
FIG. 5 is a view of the operation of the clamp of FIG. 1.

The positioning mechanism designated generally at 47 allows the user of the clamp 10 to vary the orientation of the object 200 attached to the attachment mechanism 18 with respect to the position of the clamp without releasing the object or even changing the threaded engagement between the shank 54 of the attachment mechanism and the object. As shown in FIG. 5 the position of the second object 200 relative to the first object 210, shown as a portion of a table, chair, bed, rack, etc., is adjusted by applying force (indicated by the hand 220) either on the second object 200, the attachment mechanism 18, the first object 210, or the clamping member 14 to move the second object and the clamping member away from each other. This causes the shank 54 to slide and the spring washer (shown as 62 in FIGS. 3–4) to compress so that the shank and the object can be moved temporarily from a first position wherein the object and second end 53 of the shank adjacent are disposed adjacent the clamp 10 and wherein the object cannot rotate with respect to the clamp due to the interface member, to a second position wherein the object and the second end of the shank are spaced away from the clamp, and wherein the object can be rotated (as indicated by the arrow B) to the desired orientation while remaining attached to the clamp 10 by the shaft 48. Once the desired orientation for the second object is achieved the force may be released (returning the second object to the first position), the spring decompressed, and the orientation of the second object will be maintained by the interfacing member 66.

This may be illustrated by way of an example, where the clamp 10 is used as a medical device, and a peristaltic pump is connected to the attachment mechanism, the pump may be adjusted to the desired position without removing the clamp 10 from the pole or table. The pump is adjusted by applying pressure to either the pump housing or the clamp 10 itself and moving the pump to the desired position; thus, the position of the pump can be quickly and easily adjusted.

Referring again to FIGS. 3–4, in addition to the spring washer 62, the preferred embodiment of the attachment mechanism 18 has a flat washer 73, a retaining ring 75, and a fiber washer 77 disposed between the retaining ring 75 and the flat washer 73. The flat washer 73 assists in uniform compression of the spring washer 62. The retaining ring 75 positions the shaft 48 longitudinally in attachment mechanism 18. Also, the retaining ring 75 assists in compression of the spring washer 62 as the shaft 48 is turned into and tightening upon an object to be attached, allowing for either the positioning or rigid attachment of an object to the attachment mechanism 18 when the wheel 58 is rotated, depending upon the degree of rotation of the wheel 58. The fiber washer 77 assists in reducing wear and providing smooth action between retaining ring 75 and the flat washer 73.

The preferred embodiment of the interfacing member 66, as shown in FIG. 3–4, assists in holding and positioning the second object. In the preferred embodiment, the interfacing member 66 has a first element 80 which has a hole 70 through which the shaft 48 slides. Disposed on the first element 80, around the hole 70, are protrusions 87 which form a positioning ring 90. The protrusions 87 are disposed such that the object attached thereto can be rotated and positioned at thirty degree (30°) intervals.

It will be appreciated that other angular intervals can be obtained by varying the number, position, or angular spacing of the protrusions 87.

The preferred embodiment of the clamp 10 allows for attachment of a peristaltic pump which can be rotated and positioned by the interfacing means 66 so that the position of the pump can be changed frequently, quickly, and conveniently. The clamping member 14 can be attached to any available table, bed, rack or the like and the pump positioned to meet the comfort and needs of the patient.

In the alternative embodiment the interfacing member 66 further comprises a ring-shaped second element 93, shown in FIG. 4, which interlocks with the first element 80. The second element 93 has receptacles 96 which are of a size, shape, position and dimension to match the size, shape, position and dimension of corresponding protrusions 87 on the first element 80 when the elements are mated to one another. The receptacles 96 form a mating ring 99 which fit the protrusions 87 of the positioning ring 90. The second element 93 may be attached to the second object or may be integrated into the second object. The term "integrated" as used herein means "molded, constructed or made as part of" the second object.

It will be appreciated that if the spring washer 62 is sufficiently compressible and the protrusions 87 or receptacles are sufficiently tapered, the attachment mechanism 18 may be adjusted with respect to the object simply by rotation of the object with respect to the mechanism.

It is to be understood that the protrusions 87 could alternatively be teeth, hubs, nipples, cones or similar devices, and the receptacles 96 could alternatively be grooves, recesses, intermeshing teeth or similar position holding devices. Further, the protrusions 87 and receptacles 96 may be substituted for each other on either the positioning ring 90 or the mating ring 99.

The attachment mechanism 18 is secured to the body 24 of the clamping member 14 by placing the first end 52 of the shaft 48 in a hole 110 in the body 24 of the clamping member 14, and affixing the interfacing member 66 to the body 24.

As indicated in FIG. 4, the interfacing member 66 is affixed to the body 24 of the clamping member 14 by four flat-head screws 104, 105, 106, 107. The four-flat head screws 104, 105, 106, 107 pass through four holes 100, 101, 102, 103 in the body 24 and into the interfacing member 66, which has four holes 83, 84, 85, 86 corresponding to those of the clamping member 14. While screws are used in the preferred embodiment to affix the interfacing member 66 to the body 24 of the clamping member 14, any method of affixing the clamping means 14 and the attachment means 18 may be used.

The interfacing member 66, thus attached to the body 24 of the clamping means 14, traps the attachment mechanism 18 in its position between the interfacing member 66 and the hole 110 in the body 24. The spring washer 62 is disposed between the attachment mechanism 18 and the interfacing member 66 which operates as previously discussed.

The present invention represents a significant advance over the prior apparatus, methods and art of clamps. It is noted that many of the advantages of the present invention accrue due to the simplicity of the invention, making the invention easy to understand and use.

Although the prior art for clamps has means for securing one object and attaching a second object, it lacks means for quickly changing the position of the second object relative to the first object without releasing one or both objects.

The limitations in the prior art are overcome by the present invention, which allows the relative positions of the secured and attached objects to be changed without releasing either of the objects.

Further advantages come from the interfacing member, which allows variation of the relative position of the first and second objects, and enhances the hold by the attachment means through interlocking with the attached object.

It is noted that many of the advantages of the present invention accrue do to the resilient positioning mechanism, which allows for a change of position while providing a set rigidity once the desired position is achieved. The ability to select a set rigidity is enhanced by the shaft, which allows for variation of the force of the attachment mechanism.

The wheel and shaft of the present invention eliminate the need for tools and allow operator to attach the second object by hand. The positioning mechanism eliminates the need to detach the second object to achieve a desired position. Application of sufficient force to the positioning mechanism causes flexing of the positioning mechanism, thus allowing for a quick and simple change of the relative positions of objects secured to and attached to the clamping member.

Another advantage of the present invention is the variability of the attachment mechanism, which permits variation of the force with which the second object is attached to the clamping member and the amount of force required to change the relative positions of the objects. This advantage arises because the force is communicated from the attachment mechanism through the resilient positioning means to the attached object.

An advantage of the alternative embodiment of the interfacing member, which has first and second interlocking elements, is the ease in attaching and correctly positioning the second object to the clamping member. Additional advantages come from the various ways the interlocking elements can be made, as they may be made any desired size, shape, dimension, material, and with any number available positioning structures including protrusions and receptacles, interlocking wedges, slats and edges and the like.

An added advantage offered by the present invention is the reduction of wear on objects secured by and attached to the clamping member. The reduction of wear, in part, is due to not having to repeatedly remove and reposition objects. Additionally, the clamping member has a hub which acts to reduce scrapes and wear on objects secured by the clamping member.

Those skilled in the art will appreciate from the preceding disclosure that the objectives stated above are advantageously achieved by the present invention. While the present invention is described in terms of a clamp, it is to be understood that the subject apparatus and method may be used in any field of attachment application.

It is to be understood that the above-described arrangements are only illustrative of the application of the principles of the invention. Numerous modifications and alternative arrangements may be devised by those skilled in the art without departing from the spirit and scope of the present invention and the appended claims are intended to cover such modifications and arrangements.

What is claimed is:

1. A clamp for holding a first object and a second object in a temporary, fixed orientation with respect to one another, and for selectively enabling change in the orientation without release of either object, the clamp comprising:

clamping means having a body forming a holding pocket configured to receive a first object, and a shaft disposable to selectively extend into the holding pocket for holding the first object within the holding pocket when the shaft is extending sufficiently into the holding pocket so as to contact the first object;

attachment means connected to the clamping means for engaging a second object and holding the second object to the first object, the attachment means including a slidable, rotatable shank extending outwardly from the body, the shank having a first end and a second end, the second end including coupling means configured for attachment to a second object such that rotation of the shank rotates the second object when the second end is attached to the object, the shank being slidable between a first position adjacent the clamping means and a second position wherein the shank extends outwardly, away from the clamping means, the second end of the shank being threaded for threaded engagement of the second object; and interface means disposed adjacent the shank for selectively preventing rotation of the second object when connected to the second end of the shank, the interface means being disposed to prevent rotation of the second object when the slidable shank is attached to the second object and disposed in the first position, while permitting rotation of the second object when the shank is disposed in the second position.

2. The clamp according to claim 1, wherein the attachment means further comprises biasing means for urging the shank into the first position.

3. The clamp according to claim 2, wherein the biasing means comprises a compressible washer.

4. A clamp for holding a first object and a second object in a temporary, fixed orientation with respect to one another, and for selectively enabling change in the orientation without release of either object, the clamp comprising:

clamping means having a body forming a holding pocket configured to receive a first object, and a shaft disposable to selectively extend into the holding pocket for holding the first object within the holding pocket when the shaft is extending sufficiently into the holding pocket so as to contact the first object;

attachment means connected to the clamping means for engaging a second object and holding the second object to the first object, the attachment means including a slidable, rotatable shank extending outwardly from the body, the shank having a first end and a second end, the second end including coupling means configured for attachment to a second object such that rotation of the shank rotates the second object when the second end is attached to the object, the shank being slidable between a first position adjacent the clamping means and a second position wherein the shank extends outwardly, away from the clamping means; and interface means disposed adjacent the shank for selectively preventing rotation of the second object when connected to the second end of the shank, the interface means being disposed to prevent rotation of the second object when the slidable shank is attached the second object and disposed in the first position, while permitting rotation of the second object when the shank is disposed in the second position, the interface means comprising a plurality of projections extending outwardly and configured to engage the second object when the second object is attached to the second end of the shank.

5. The clamp according to claim 4, wherein the interface means further comprises an interface ring configured for connection to the second object.

6. A clamping system comprising:

a clamp for holding a first object and a second object in a temporary, fixed orientation with respect to one another, and for selectively enabling change in the orientation without release of either object, the clamp comprising:

clamping means having a body forming a holding pocket configured to receive a first object, and a shaft disposable to selectively extend into the holding pocket for holding the first object within the holding pocket when the shaft is extending sufficiently into the holding pocket so as to contact the first object;

attachment means connected to the clamping means for engaging a second object and holding the second object to the first object, the attachment means including a slidable, rotatable shank extending outwardly from the body, the shank having a first end and a second end, the second end including coupling means configured for attachment to a second object such that rotation of the shank rotates the second object when the second end is attached to the object, the shank being slidable between a first position adjacent the clamping means and a second position wherein the shank extends outwardly, away from the clamping means; and interface means disposed adjacent the shank for selectively preventing rotation of the second object when connected to the second end of the shank, the interface means being disposed to prevent rotation of the second object when the slidable shank is attached the second object and disposed in the first position, while permitting rotation of the second object when the shank is disposed in the second position; and a first object and a second object, the first object being held in the holding pocket and the second object having engagement means for engaging the interface means; and wherein at least one of the interface means and the engagement means comprises a plurality of protrusions, and wherein the other of the interface means and the engagement means comprises a plurality of receptacles, the protrusions and receptacles being configured to engage each other and thereby inhibit rotation of the second object with respect to the clamping means.

7. A clamping system comprising:

a first object and a second object; and a clamp for holding the first object and the second object in a predetermined orientation with respect to one another: and for selectively enabling change in the orientation without release of either object, the clamp comprising:

clamping means having a body forming a holding pocket configured to receive the first object, and a shaft disposable to selectively extend into the holding pocket for holding the first object within the holding pocket when the shaft is extending sufficiently into the holding pocket so as to contact the first object;

attachment means connected to the clamping means for engaging the second object and holding the second object to the first object, the attachment means including a slidable, rotatable shank extending outwardly from the body, the shank coupling means configured for attachment to the second object such that rotation of the shank rotates the second object when the second end is attached to the object, the shank being slidable between a first position adjacent the clamping means and a second position wherein the shank extends outwardly, away from the clamping means; and interface means disposed adjacent the shank for selectively preventing rotation of the second object when connected to the second end of the shank, the interface means being disposed to prevent rotation of the second object when the slidable shank is attached to the second object and disposed in the first position, while permitting rotation of the second object when the shank is disposed in the second position; and the first object being held in the holding pocket and the second object having engagement means for engaging the interface means to thereby selectively prevent rotation of the shank:

wherein the second object includes a threaded hole formed therein, said threaded hole being configured for engagement with the second end of the shank to attach the second object to the attachment means.

8. A clamping system comprising:

first object and a second object; and clamp for holding the first object and the second object in a predetermined orientation with respect to one another, and for selectively enabling change in the orientation without release of either object, the clamp comprising:

clamping means having a body forming a holding pocket configured to receive the first object; and a shaft disposable to selectively extend into the holding pocket for holding the first object within the holding pocket when the shaft is extending sufficiently into the holding pocket so as to contact the first object;

attachment means connected to the clamping means for engaging the second object and holding the second object to the first object, the attachment means including a slidable rotatable shank extending outwardly from the body, the shank having a first end and a second end, the second end including coupling means configured for attachment to the second object such that rotation of the shank rotates the second object when the second end is attached to the object, the shank being slidable between a first position adjacent the clamping means and a second position wherein the shank extends outwardly, away from the clamping means; and interface means disposed adjacent the shank for selectively preventing rotation of the second object when connected to the second end of the shank, the interface means being disposed to prevent rotation of the second object when the slidable shank is attached to the second object and disposed in the first position, while permitting rotation of the second object when the shank is disposed in the second position; and the first object being held in the holding pocket and the second object having engagement means for engaging the interface means to thereby selectively prevent rotation of the shank, wherein the second object is a pump.

9. The clamping system according to claim 8, wherein the first object is selected from a group consisting of a table, a bed and a rack.

10. A clamping system for holding a first object and a second object adjacent one another and for selectively enabling movement of the second object relative to the first object while maintaining attachment to both the first and second objects, the clamping system comprising:

clamping means configured for clampingly engaging the first object;

attachment means connected to the clamping means for attachment to the second object, the attachment means comprising a slidable, rotatable engagement means configured for attachment to the second object, the slidable, rotatable engagement means being slidable toward and away from the clamping means, said rotatable engagement means comprising a threaded end configured for threadedly engaging the second object; and positioning means disposed adjacent to the attachment means, the positioning means being configured to prevent rotation of the engagement means when the engagement means is attached to the second object unless the engagement means is slid outwardly, away from the clamping means.

11. The clamping system of claim 10, further comprising urging means for biasing the engagement means toward the clamping means.

12. The clamping system of claim 10, wherein the engagement means comprises a shank and a wheel disposed about the shank for rotating the shank.

13. A clamp assembly comprising:

a first object;

a second object having a hole formed therein, the hole being configured for attachment to a shank;

clamping means for clamping onto the first object;

a manually operable attachment means coupled to the clamping means for attachment to the second object so as to hold the second object in a desired position relative to the first object, said attachment means including a positioning means for repositioning the second object relative to the first object without detaching said second object from the attachment means, the attachment means comprising a shank having an engagement means configured for engaging the hole of the second object, and a wheel for rotating the shank to thereby rotate the second object; and means for selectively preventing the rotation of the second object.

* * * * *